June 16, 1953    A. G. PLIMMER    2,641,970
HIGH-SPEED SPINDLE CONSTRUCTION
Filed Sept. 28, 1950    2 Sheets-Sheet 1
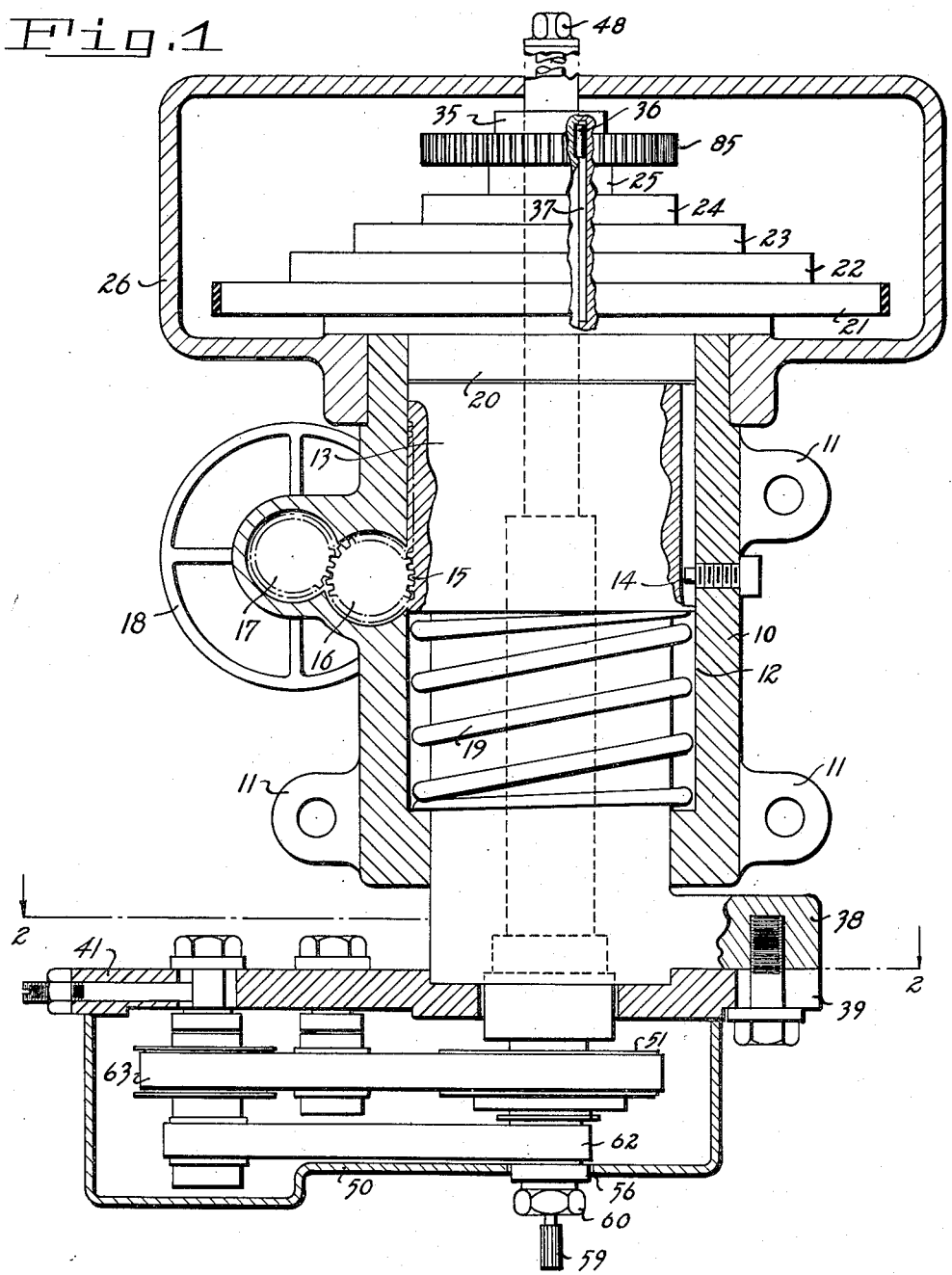
INVENTOR.
ALFRED G. PLIMMER
BY
H. H. Parsons & L. W. Wright,
ATTORNEYS

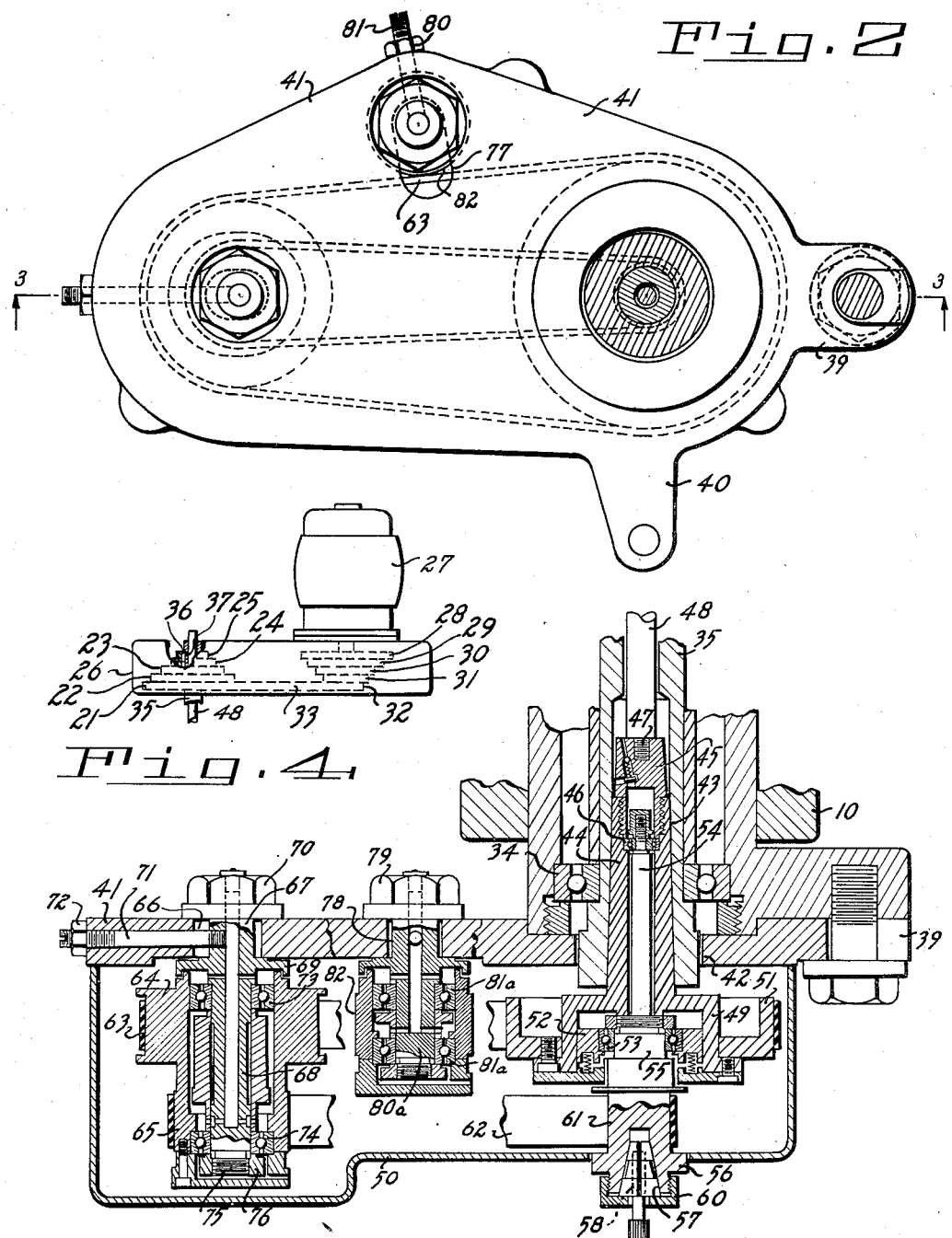

Patented June 16, 1953

2,641,970

UNITED STATES PATENT OFFICE 2,641,970

HIGH-SPEED SPINDLE CONSTRUCTION

Alfred G. Plimmer, Cincinnati, Ohio, assignor to The Cincinnati Milling Machine Co., Cincinnati, Ohio, a corporation of Ohio Application September 28, 1950, Serial No. 187,247

2 Claims. (Cl. 90—16)

This invention relates to improvements in milling machines and has particular reference to a high speed spindle construction for use in connection therewith.

One of the objects of the present invention is the provision of an improved high speed spindle structure capable of being built into or detachably applied to a milling or die sinking machine and which is particularly adapted for operation of the fine milling or like cutting tools as utilized in the production of jewelry or like delicately but accurately contoured die surfaces.

A further object of the invention is the provision of a structure of this character in which a high actual speed of revolution of a cutting tool may be effected with a minimized rate of bearing operation compatible with such speed.

An additional object of the invention is the provision of an improved unitary or self-contained structure of simple form and design by which a wide variation in operating speeds of the spindle and cutting tool carried thereby may be readily effected.

Other objects and advantages of the present invention should be readily apparent by reference to the following specification, considered in conjunction with the accompanying drawings forming a part thereof, and it is to be understood that any modifications may be made in the exact structural details there shown and described, within the scope of the appended claims, without departing from or exceeding the spirit of the invention.

Figure 1 is a vertical sectional view of an embodiment of the invention.

Figure 2 is a view partially in plan and partially in section as on the line 2—2 of Figure 1.

Figure 3 is a vertical sectional view on the line 3—3 of Figure 2.

Figure 4 is a fragmentary semi-diagrammatic view illustrating the self-contained motor drive.

Figure 5 is a diagrammatic view of a modified variable speed drive for the high speed spindle.

In the drawings the numeral 10 designates the main frame or casing having the attaching lugs or bracket portions 11 which may be suitably bolted to a milling machine overarm or standard spindle carrier. The member 10 has a central bore at 12 in which is vertically slidable the quill 13 keyed against rotation as by the pin 14. The quill is further formed with the rack 15 meshing with the pinion 16, in turn adjustable by rotation of control pinion 17 actuable by pilot wheel 18. It will thus be seen that by rotation of the wheel 18 the quill may be given the desired vertical movement with respect to the casing 10. For counterbalancing the weight of the quill and associate parts, use is made of spring 19.

Fitted in the upper end of the bore 12 is the pulley bearing block 20 rotatably mounting and supporting a drive pulley shown as having the stepped portions 21, 22, 23, 24, and 25 or progressively decreasing diameters. Fitted on the upper end of the member 10 is the housing 26 which supports the drive motor 27 carrying a stepped pulley having the sections 28, 29, 30, 31, and 32 of progressively downwardly decreasing diameter. Drive belt 33, shown as connecting the respective pulleys 21 and 32, may be selectively engaged on the various pairs of pulleys of the motor and the quill assembly for effecting various driving speeds.

Journaled within the quill as by suitable ball or anti-friction bearings 34 is the main spindle 35, supported by the bearings 34 for rotative movement with respect to but against axial movement relative to the quill. At its upper end the spindle sleeve 35 is provided with a key 36 engaged in keyway 37 of the surrounding pulley cluster so that proper driving action will be transmitted to the spindle sleeve 35 irrespective of the vertical adjustment thereof effectable by movement of the quill 13.

The quill is provided at its lower end with attachment lugs as at 38 to which are bolted lugs such as 39 and 40 of the plate 41, which has an aperture as at 42 circumscribing the lower end of the spindle sleeve 35. It will be noted that the lower end of the spindle sleeve is formed with the slightly tapered socket 43 to receive the tapered tang of the high speed spindle bearing sleeve 44. This tang is provided with the cap or plug 45 threaded into its upper end and serving to clamp in position the upper high speed anti-friction bearing 46. Additionally, it has a threaded socket as at 47 to receive the threaded end of the draw bolt 48 which extends upward through the spindle sleeve 35, being tightened against the outer end of the sleeve firmly to lock and retain the tang 44 in position. Spindle 35 is provided with ratchet wheel 85 by which the spindle may be held against rotation as when tightening draw bolt 48.

The spindle bearing sleeve has an enlarged flange or cuplike portion at 49 disposed in underlying relation to the plate 41 and within the chamber provided by the cover 50. Disposed exteriorly on the member 49 is the drive pulley 51 while interiorly contained within the member 49 is the bushing 52 supporting the anti-friction bearing 53.

Fitting within the bore of the bearing sleeve 44 is the high speed spindle 54 having a reduced terminal portion interfitting with the anti-friction bearing 46 and a shoulder portion at 55 interfitting with the inner race of the anti-friction bearing 53. It will be noted that there is clearance between the bearing sleeve 49 and the high speed spindle 54 so that the same is supported solely by the anti-friction bearings for free rotational movement. The spindle has the terminal head portion 56 provided with a taper socket 57 to receive a tang 58 on the milling or cutting tool 59 clamped in position by the threaded collar 60.

The spindle has further been shown as formed with the intermediate pulley portion 61 receiving the drive belt 62.

It will be noted that there is a first drive belt 63 passing around the pulley 51 carried by the bearing sleeve. This belt is of the endless type extending also around the upper part 64 of a multiple pulley member having a lower pulley 65 around which passes the belt 62. For support of the pulley member the plate 41 is slotted as at 66 to receive the stud 67 of axle 68 having the flange shoulder 69 adapted to be clamped against the underside of plate 41 by nut 70 threaded on the upper projecting end of the stud 67. To facilitate ready and accurate adjustment and locking of the axle in desired radially shifted position to produce proper belt tension an adjusting bolt 71 is threaded into the stud 67 and extends outward through a passage in the plate 41. Mounted on the outer end of the member 71 is a lock nut 72 movable for purposes of outwardly adjusting the stud and axle and supplementing the action of the nut 70 in retaining the parts in adjusted position.

Carried by the axle 68 are the anti-friction bearings 73 and 74, which serve to mount the pulley unit 64—65 for free rotation on the axle. The lower end of the axle is threaded as at 75 to engage the lock nut 76 which serves removably to retain the pulley unit and bearings in position so that the pulley unit can be reversed or units having different ratio between the elements 64 and 65 substituted as may be desired according to the ultimate rotative speed to be transmitted to the tool 59. In use, the axle stud 68 is preferably so adjusted as to produce the desired driving tension as respects the drive belt 62. To take care of any discrepancies in length or variations due to pulley substitutions, the plate 41 is provided with an additional lateral offset slot at 77 receiving the stud axle 78 retained in adjusted position in the slot by nut 79 whose action is supplemented by the locking nut 80 on bolt 81 which is carried by the stud 78 in the same manner that the bolt 71 is carried by stud axle 67. This stud 78 extends downwardly or inwardly in the axle portion 80a carrying the anti-friction bearings 81a which mount the idler pulley 82 which bears as shown in Figure 2 against the outer face of belt 63 to insure that the same operates under proper driving tension.

It will be noted that the drive shown for the main spindle 35 constitutes a first variable speed mechanism. By selective positioning of the belt 33 on various of the pulleys carried by the motor shaft and the nest of pulleys which drive the spindle, it may be operated at a speed less than or a speed several times greater than the rate of operation of the motor 27, which is ordinarily a standard 1800 R. P. M. electric motor. In this manner a speed of several thousand R. P. M. may be satisfactorily imparted to the outer spindle 35, which is adequately supported by the large circumscribing bearings such as 34 which rigidly and non-vibrationally maintain the spindle in position without tendency of overheating of the bearings at such speeds due to their relatively large size and area. At the same time an additively increased speed in the same direction of rotation as that of the spindle 35 is imparted to the contained high speed spindle which carries the tool 59. As examples of the speed thus accomplishable if the pulley 64 has a 3" diameter and the pulley portion 65 a 1⅞" diameter, for a given rate of rotation of the spindle 35, the high speed spindle will be operated at 10,000 R. P. M. Making the pulleys of substantially the same diameter, that is, the pulley 64 2¹⁵⁄₁₆" diameter and pulley 65 2³⁄₁₆" diameter, the speed will be stepped up to 15,000 R. P. M. If pulley 64 is reduced in diameter to 1⅝" and pulley 65 increased to 3³⁄₁₆", the high speed spindle will be operated at 35,000 R. P. M. Corresponding changes in size of the respective pulleys, of course, make possible corresponding speed increases or decreases, the interchangeable pulleys thus providing a second variable speed mechanism. As an alternative, multiple pulleys may be provided on one or both of the spindle ends, such as the pulleys 86, 87, 88, 89 of Figure 5 for selective interconnection by the belts 90 and 91. This arrangement provides a second organized variable speed transmission to determine the alternate rate of revolution or R. P. M. of the high speed spindle. In all of these instances, however, the actual rate of rotation of the high speed spindle with respect to its support bearings as contained within the main spindle 35 and high speed spindle bearing sleeve 44 will be at a relatively very slow rate of rotation well within the capacity of the bearings 53 and 34 adequately to support the same against vibratory effects and without overheating.

As has been indicated, the nut 76 is readily removable to permit of interchangeable employment of back pulley units, such as the unit 64—65 of relative sizes as desired for varying the effective speed or R. P. M. of the cutter 59, which speed is the additive sum of the speeds of rotation of the main spindle 35 and the auxiliary contained high speed spindle.

While for simplicity of operation the quill element has been indicated as vertically adjustable through utilization of the rack and pinion mechanism and pilot wheel 18, it will be appreciated that in many instances it is desirable that the up and down or rise and fall movement of the tool 59 be automatically controlled by employment of a suitable either direct acting or power controlling tracer mechanism which can be advantageously coupled with a lug or flange such as the element 38 of the quill. This feature in itself forms no part of the present invention but is illustrated for example in pending application, Serial No. 765,555.

What is claimed is:

1. A high speed spindle structure for use in connection with a milling machine or the like including a quill, a main hollow spindle journaled in the quill, an auxiliary high speed spindle rotatably journaled within the main spindle, a driving pulley carried by the main spindle, a drivable pulley carried by the high speed spindle, said quill having a stud portion adjacent said driving pulley and radially extending attachment lugs, a frame plate having a socket to receive the stud portion of the quill and attachment lugs for cooperation with the lugs on the quill, means for securing the attachment lugs on the plate to the lugs of the quill, said plate having an extending frame portion provided with a stud receiving slot, a stud axle adjustably mounted in said slot, a back pulley unit carried by said axle having a pair of spaced pulley portions, a first belt connecting the pulley on the main spindle with one of said pulleys on the unit, a second belt connecting the other pulley of the unit with the pulley on the auxiliary high speed spindle, said plate having a passage formed therein intersecting said slot, and an adjusting member carried by the stud axle having a portion extending by way of the passage to the edge of the plate, a nut mounted on said adjusting member and engaging the plate for determining the positioning of the axle, and additional means for locking the axle in adjusted position whereby the adjustment of the axle will determine the tension of the pulley connecting belts.

2. A high speed spindle structure for use in connection with a milling machine or the like including a quill, a main hollow spindle journaled in the quill, an auxiliary high speed spindle rotatably journaled within the main spindle, a driving pulley carried by the main spindle, a drivable pulley carried by the high speed spindle, said quill having a stud portion adjacent said driving pulley and radially extending attachment lugs, a frame plate having a socket to receive the stud portion of the quill and attachment lugs for cooperation with the lugs on the quill, means for securing the attachment lugs on the plate to the lugs of the quill, said plate having an extending frame portion provided with a pair of angularly related slots, a first stud axle adjustably mounted in one of said slots, a back pulley unit carried by said axle having a pair of spaced pulley portions, a first belt connecting the pulley on the main spindle with one of said pulleys on the unit, a second belt connecting the other pulley of the unit with the pulley on the auxiliary high speed spindle, said plate having a passage formed therein intersecting said first slot, and an adjusting member carried by the stud axle having a portion extending by way of the passage to the edge of the plate, a nut mounted on said adjusting member and engaging the plate for determining the positioning of the axle, additional means for locking the axle in adjusted position whereby the adjustment of the axle will determine the tension of the pulley connecting belts, a second stud axle slidably mounted in the other of the angularly related slots in the plate, a belt engaging idler rotatably mounted on said second stud axle, adjusting means intervening the plate and second axle for determining the positioning of the second axle with respect to the plate and thus of its supported idler with respect to one of the pulley connecting belts for determining the tensioning of said belt, and additional means for locking the second stud axle in its adjusted position with respect to the plate.

ALFRED G. PLIMMER.

References Cited in the file of this patent

UNITED STATES PATENTS

| Number | Name | Date |
|---|---|---|
| 1,416,777 | Bayrer | May 23, 1922 |
| 1,735,398 | Hoagland | Nov. 12, 1929 |
| 2,364,328 | Thorsberg | Dec. 5, 1944 |
| 2,428,049 | Tate | Sept. 30, 1947 |